Sept. 29, 1964

E. W. ANTHON 3,151,073

CENTRIFUGING APPARATUS

Filed Oct. 7, 1960

INVENTOR:
ERIK W. ANTHON
BY
Schapp & Hatch
ATTORNEYS

Sept. 29, 1964   E. W. ANTHON   3,151,073
CENTRIFUGING APPARATUS
Filed Oct. 7, 1960
6 Sheets-Sheet 2

INVENTOR:
ERIK W. ANTHON
BY
Schapp & Hatch
ATTORNEYS

Sept. 29, 1964

E. W. ANTHON 3,151,073

CENTRIFUGING APPARATUS

Filed Oct. 7, 1960

INVENTOR:
ERIK W. ANTHON
BY Schapp & Hatch
ATTORNEYS

Sept. 29, 1964     E. W. ANTHON     3,151,073
CENTRIFUGING APPARATUS Filed Oct. 7, 1960     6 Sheets-Sheet 6

FIG. 11     FIG. 12

INVENTOR:
ERIK W. ANTHON
BY Schapp & Hatch
ATTORNEY

United States Patent Office 3,151,073
Patented Sept. 29, 1964

3,151,073
CENTRIFUGING APPARATUS
Erik W. Anthon, Kensington, Calif., assignor to Research Specialties Co., Richmond, Calif., a corporation of California
Filed Oct. 7, 1960, Ser. No. 61,129
15 Claims. (Cl. 233—4)

The present invention relates to improvements in centrifuging apparatus and more particularly to centrifuges used in connection with chemical analysis of multiple samples.

Analytical centrifuges of the present type consist essentially of a high speed rotor upon which are mounted tube carriers in which metal or glass centrifuging tubes stand. The tube carriers are pivoted on the rotor so as to permit the bottoms of the tubes to swing radially outwardly as the rotor picks up speed. The high speed of rotation causes materials of different densities to settle out in the centrifuge tubes, aiding in the analysis of the contents.

Conventionally, the tubes are loaded into the tube carriers by hand, the rotor is spun either manually or by means of a motor for a desired period of time, the rotor is brought to a halt and the tubes are taken manually from the tube carrier. Where large numbers of samples of similar character are to be handled, the described procedure is remarkably inefficient. It requires the constant attendance of a trained operator and the manual loading and unloading of the rotor with a great number of centrifuge tubes is a tedious and boring task.

The present invention contemplates a self-contained unitary apparatus which will automatically load the tubes into the tube carriers, will start up and spin the centrifuge for the correct period of time, will then unload the tube carriers and refill them with fresh samples and will repeat the centrifuging cycle until the entire batch of samples has been run through. Once the machine is loaded and its operation started, it will continue through the entire batch of samples without attention by the operator. These characteristics make the apparatus particularly suited for use as a module in an automated analytical system.

It is therefore a principal object of the present invention to provide an apparatus capable of automatically centrifuging a large number of samples and placing such samples in condition for further processing in a rapid and precise manner and without attention by the operator.

Another object of the present invention is to provide a centrifuging apparatus capable of handling a large number of samples in a series of batch operations which will continue so long as is required to process all of the samples.

A further object of the invention is to provide a centrifuging apparatus of the character described which is furnished with a plurality of sample containing racks adapted for easy loading onto and unloading from the apparatus.

A still further object of the present invention is to provide, in a centrifuging apparatus of the character described, a transfer device which will automatically pick up tubes from the tube racks and which will place them in the tube carriers ready for centrifuging, the device also being effective to automatically return the tubes from the tube carriers to the racks after the centrifuging operation is completed.

Another object of the invention is the provision of a transfer device of the character described which will grip the tubes in the racks, lift them vertically therefrom, move them to a position overlying the tube carriers, lower them into the tube carriers and release the tubes.

It is still further proposed to provide a transfer device of the character described which will simultaneously transfer fresh samples from the racks of the tube carriers and transfer the centrifuged tubes from the tube carriers to the racks so as to cut the transfer time in half.

Another object of the present invention is to provide, in a centrifuging apparatus of the character described, a self-indexing centrifuge rotor which will automatically position the tube carriers at the proper location for a transfer device to operate in the described manner.

It is further proposed to provide an automatic centrifuging apparatus of the character described which incorporates an interconnected control system in which each movement of the apparatus is initiated upon completion of the preceding movement so as to provide smooth and efficient operation of the apparatus.

Additionally, it is proposed to provide an automatic centrifuging apparatus which possesses great flexibility as to the number of tubes which may be handled, the speed and duration of spin of the centrifuge rotor, and the retention in the machine of the centrifuged samples in condition for further processing.

Further objects and advantages of my invention will appear as the specification continues, and the new and useful features of my centrifuging apparatus will be fully defined in the claims attached hereto.

The preferred form of my invention is illustrated in the accompanying drawings forming part of this application, in which.

While I have shown only the preferred form of my invention, it should be understood that various changes or modifications may be made within the scope of the claims hereto attached, without departing from the spirit of the invention.

Referring to the drawings in detail, it will be seen that the automatic centrifuge of the present invention consists basically of a spinnable centrifuging rotor 21, conveyor means 22 formed for supporting a plurality of centrifuge tubes 23 and for presenting such tubes to a Station A in sequential order, and a transfer device 25 formed for transporting tubes to be centrifuged from the Station A to a Station B at the rotor 21 and for transporting centrifuged tubes from the rotor back to the conveyor 22.

The rotor 21 is adapted to support and spin a plurality of circumferentially spaced tube supporting carriers 24. As may best be seen from FIGURE 4, the tube carriers 24 are formed with wells 26 in which the centrifuge tubes 23 may stand erect. As the rotor 21 spins, the tube carriers 24 swing about pivots 27 until the tubes 23 are in the radially extending horizontal position illustrated at the right hand side of FIGURE 4. Preferably, rubber blocks 28 are inserted at the bottom of wells 26 to cushion and prevent fracturing of the glass tubes 23.

Figure 1:
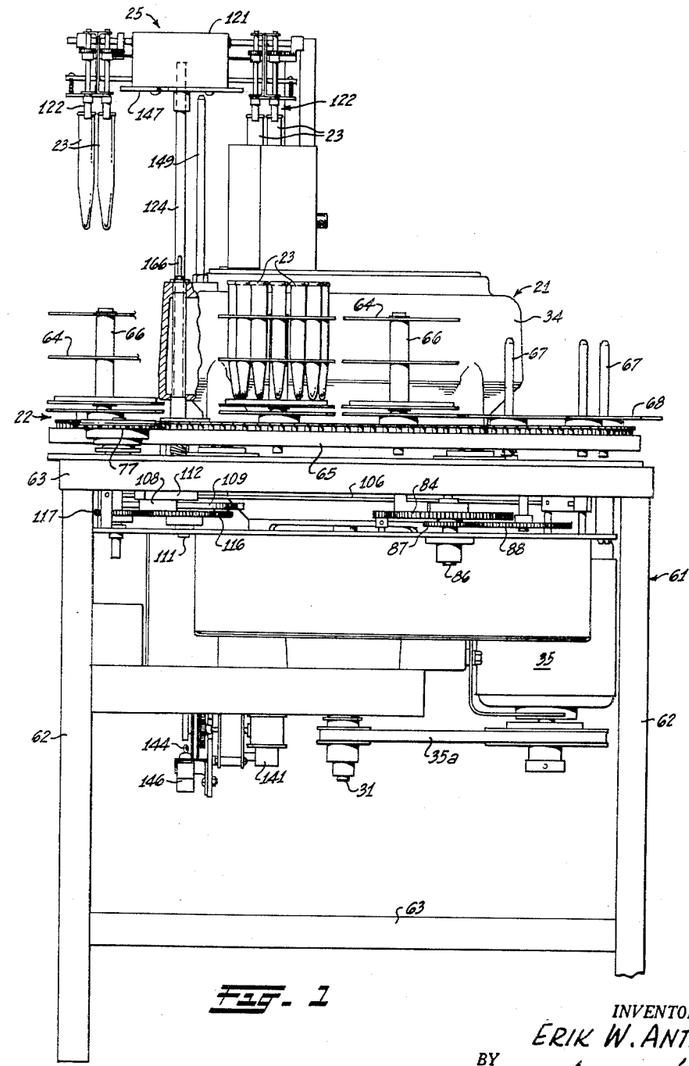
FIGURE 1 is a side elevational view of a centrifuging apparatus constructed in accordance with the present invention.

The rotor 21 also includes a body portion 29 upon which the tube carriers 24 are mounted, body 29 being secured to a shaft 31 carried in bearings 32 and 33 for high speed rotation about a vertical axis. Rotation of the shaft 31 is provided by a motor 35, see FIGURE 1, acting through a belt drive 35a.

Preferably, the centrifuge rotor 21 and shaft 31 are mounted within a housing having an upper portion 34 surrounding the centrifuge rotor, and a lower portion 36 supporting the lower shaft bearings 33 and providing mounting space for other centrifuge control devices. In accordance with good centrifuge practice, the entire unit is provided with free-floating mountings 37 which support the weight of the unit upon cushions of rubber so as to resiliently damp out unwanted vibration effects. Additional floating mountings 38 and 39 may be provided between the housing and the upper and lower bearings 32 and 33, respectively.

In accordance with the present invention and as an important feature thereof, the centrifuge is provided with rotor indexing means 41 formed for selectively positioning the tube supporting carriers 24 at the predetermined Station B in sequential order. Station B is related to Station A in such manner as to facilitate transfer of tubes between the rotor 21 and the tube carriers 24 by the transfer device 25.

Included in the rotor indexing means 41 is a reversible indexing drive motor 42 and a clutch means 43 for selectively connecting the indexing motor to the centrifuge shaft 31. The motor 42 is reversible and is preferably mounted on the housing 36, see FIGURE 4. Depending from the motor 42 is a shaft having a spur gear 44 engaged with a gear 46 journaled on shaft 31 by means of bearings 45. One element 47 of the clutch is secured on the lower end of the hub of the gear 46 and the other clutch element 48 is splined on shaft 31 for vertical movement toward and away from element 47.

Figure 4:
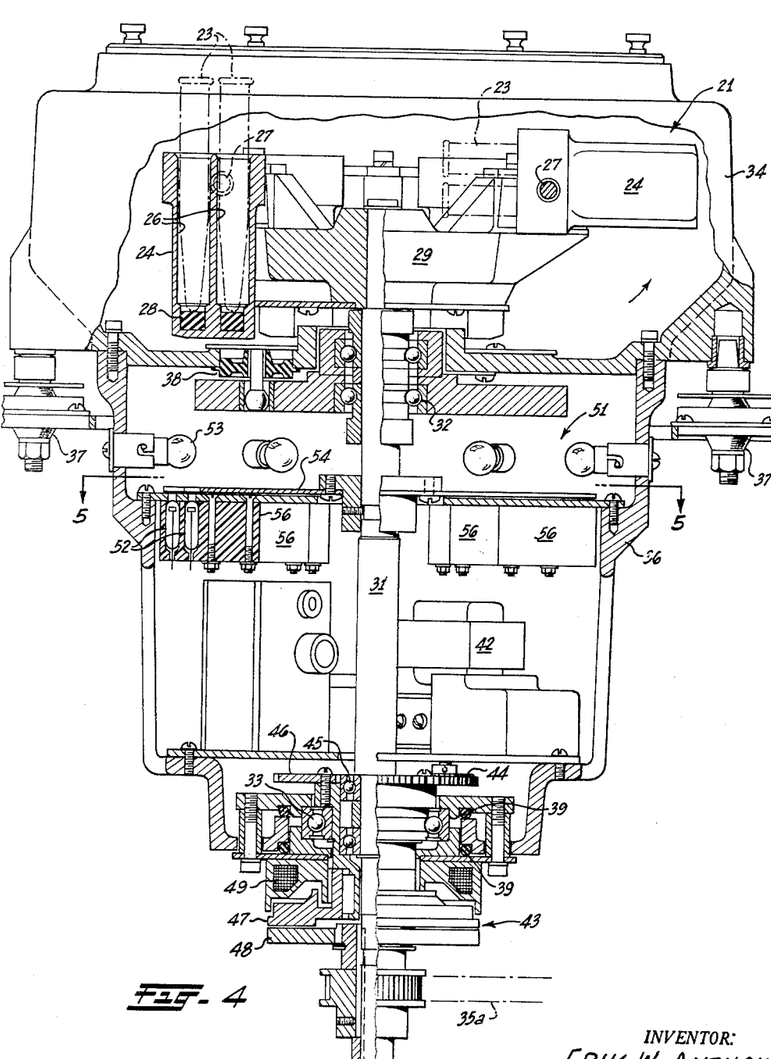
FIGURE 4, an enlarged fragmentary cross-sectional view of a centrifuge rotor and drive therefor forming a part of the apparatus of FIGURE 1.

Mounted on housing 36 is an electro-magnetic coil 49 which is operable when energized to urge the clutch member 48 into frictional engagement with the clutch member 47. In this manner indexing motor 42 may be selectively connected with shaft 31 for indexing the rotor and disconnected from shaft 31 while the latter is being driven by the main drive motor 35.

Photoelectric control means 51 for operating indexing motor 42 is mounted in the upper end of the housing section 36. The means 51 is responsive to movements of the rotor 21 and is connected to the motor 35 and clutch 43 for effecting rotation of the rotor so as to position the tube carriers 24 at Station B in a desired sequential order.

Figures 5, 6, 7:
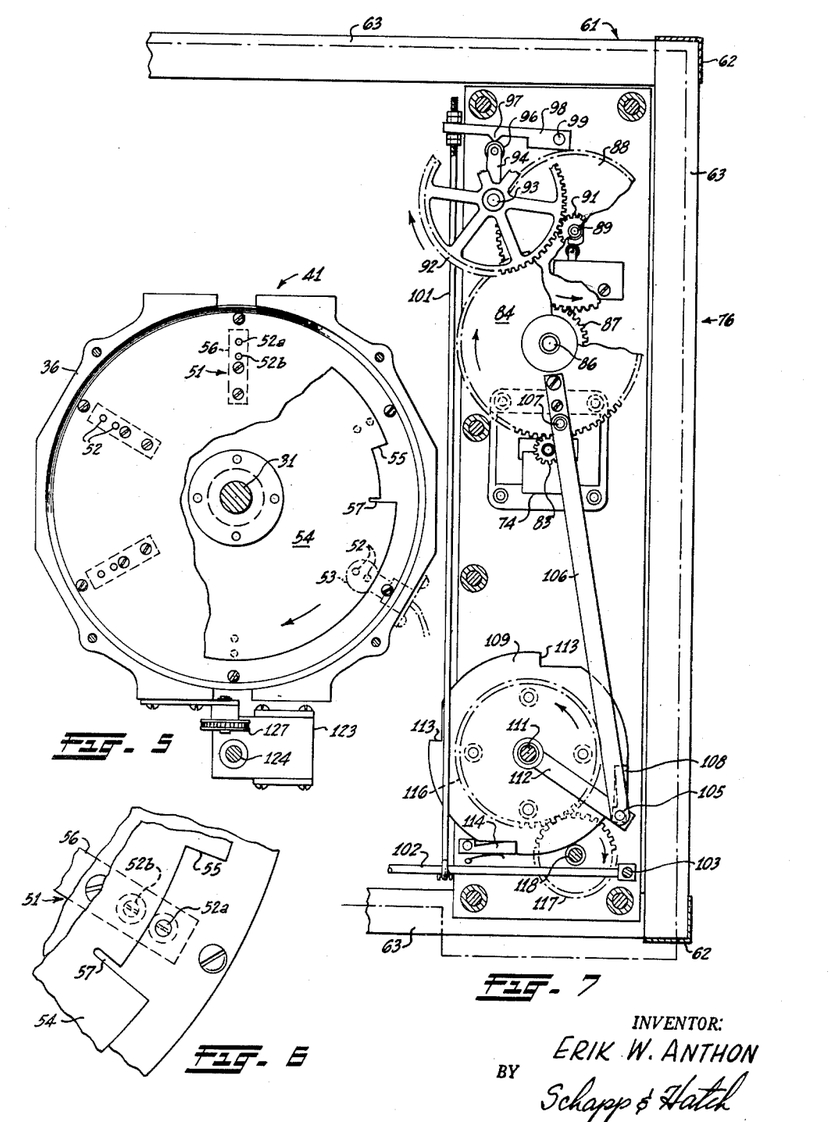
FIGURE 5, a plan sectional view taken substantially on the plane of line 5—5 of FIGURE 4, and illustrating a rotor indexing means.
FIGURE 6, an enlarged fragmentary detail view of a slot and photoelectric cell arrangement forming an operative part of the indexing device of FIGURE 5.
FIGURE 7, an enlarged fragmentary plan sectional view of the right hand side of the apparatus of FIGURE 2, and illustrating a conveyor advancing system forming part of the present invention, the upper portion being removed to show internal details.

As may best be seen from FIGURE 5 of the drawings, the photoelectric control means 51 includes a plurality of pairs of photoelectric cells 52 mounted in equally circumferentially spaced relation around shaft 31 and having individual light sources 53 overlying and aligned with the pairs of photoelectric cells 52. Carried for joint rotation on shaft 31 and interposed between source 53 and cells 52 is a circular plate 54.

The photoelectric cells are arranged in pairs in block units 56 and the number of block units is equal to the number of tube carriers in the centrifuge rotor 21. Each of the block units 56 controls the movement of the rotor so as to position one of the tube carriers at Station B.

This control is effected by notching out the edge of plate 54 in the manner best seen in FIGURE 6 of the drawings. As will be seen in the figure, a fairly long notch, on the order of 20° of arc, is cut in such manner as to expose the outer photoelectric cell 52a to its light source when the notched section passes thereover. At one end of the long notch 55 is a very short notch 57 which exposes the inner photoelectric cell 52b to its light source when notch 57 passes thereover.

The reversing indexing motor 42 has two speeds in its opposite directions of travel. The faster speed is used to bring the notched portion of the plate 54 to the next block unit 56, while the reverse speed is much slower and is used to precisely position the rotor so the correct tube carrier will be exactly at Station B.

Thus, as the rotor and plate 54 are revolved by motor 42, notch 55 will uncover the desired one of the photoelectric cells 52a. This will operate a relay reversing the motor 42. Because of the substantial length of notch 55, the reversing of the motor will cause the rotor to come to a halt and then creep back until notch 55 permits light to fall upon photoelectric cell 52b. This operates another relay which shuts of the indexing motor until the next sample has been brought to the tube carriers and the centrifuged sample removed.

In accordance with the present invention, the conveyor means 22 is formed for supporting a plurality of sample-containing centrifuge tubes and for presenting these tubes to Station A in sequential order. As may best be seen from FIGURE 2 of the drawings, the conveyor means 22 includes a ring-shaped turntable 65 mounted for coaxial rotation around the centrifuge rotor 21. Preferably, and as here shown, the centrifuge, the conveyor means 22 and the transfer device 25 are all mounted upon a table 61 consisting of vertical legs 62 and suitable cross-members 63.

Figure 2:
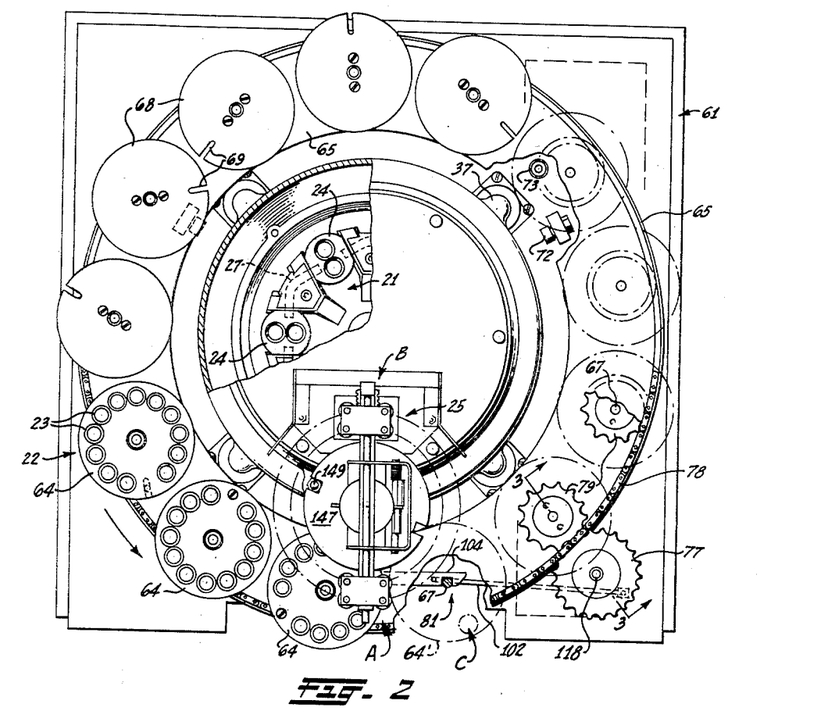
FIGURE 2, a plan view of the apparatus of FIGURE 1, portions being broken away and shown in section to illustrate internal structure.

A plurality of tube-supporting spools 64 are mounted for rotation on the ring-shaped turntable 65 and are movable therewith around the rotor 21. These spools 64 each support a desired number of sample-containing tubes and preferably are formed so as to be removable from the machine for loading and unloading of the sample tubes. To this end the spools 64 are formed with a hollow central member 66 adapted to fit over posts 67 projecting upwardly from the turntable 65 in circumferentially spaced relation therearound. Journaled upon each post 67 is a small disk-shaped turntable 68 having a notch 69 in its periphery in which a pin 71, projecting downwardly from spool 64, may be engaged.

The large turntable 65 is supported for rotation around the central axis of the centrifuge upon rollers 72 and 73 supported upon table 61. This rotation is here accomplished by a means which includes a drive motor 74 acting through an intermittent drive means 76, a sprocket 77 rotated by the drive means 76 and a roller chain 78 engaged with sprocket 77 and with sprockets 79 journaled on the posts 67, see FIGURE 7.

The cumulative resistance to turning of the sprockets 79 is greater than the resistance of the turntable to rotation upon the rollers 72 and 73 so that turntable 65 will be rotated by movement of chain 78 and the spools 64 will not rotate relative to the turntable 65 until the latter is held against rotation by a latch mechanism 81 supported upon table 61, see FIGURE 2.

When the latch 81 is engaged, movement of chain 78 will rotate the sprockets 79 on posts 67 and cause the spools 64 to rotate in accordance with the movement of chain 78.

Figure 3:
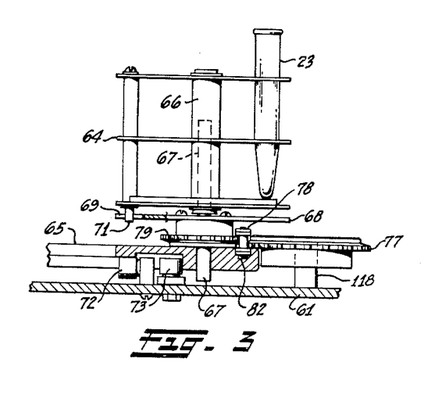
FIGURE 3, an enlarged cross-sectional view taken substantially on the plane of line 3—3 of FIGURE 2.

Positive engagement of sprockets 77 and 79 with chain 78 is insured by sliding the chain in a circular guide groove 82 concentric with the turntable 65. Sprocket 77 engages the outer periphery of the chain 78 and sprockets 79 engage the inner periphery. As may be seen from FIGURE 3, this is made possible by constructing the sprockets 77 and 79 in the form of split sprockets, that is, by making each sprocket half the normal width for the size of chain used so the sprockets may pass each other.

The intermittent drive means 76 may best be seen in FIGURE 7 of the drawings and as there shown, the motor 74 is provided with an output gear 83 enmeshed with a larger gear 84 journaled in the table 61. Mounted on the same shaft 86 as gear 84 is a pinion gear 87 which is enmeshed with a gear 88 mounted on shaft 89. Also mounted on shaft 89 is a pinion 91 engaged with a wheel gear 92 carried by shaft 93.

The described gear train is used to effect release of the latch mechanism 81 at the proper times during the operative cycle of the machine. This is accomplished by an arm 94 secured to the shaft 93 for rotation therewith and having a roller 96 journaled on its outer end. This roller is formed to intercept a raised boss 97 carried by an arm 98 pivoted on a shaft 99 carried by the table 61. The outer end of arm 98 is secured to a rod 101 which is in turn secured to a lever 102 pivoted at one end 103 to the table and connected at its other end to a latch member 104, the latter being pivoted on the table 61 and forming part of the latch mechanism 81.

When the arm 98 is displaced by engagement of the roller 96 with boss 97, it swings lever 102 on its pivot 103 and urges latch member 104 out of engagement with a downwardly extending end of a post 67.

This permits the advance of chain 78 to rotate the turntable 65 until the latch member 104 engages with the next post 67. The effect of this is to permit the conveyor to move a spool full of centrifuged samples away from Station A and move the next spool full of samples to be centrifuged into position to present its sample tubes at Station A.

The advancement of chain 78 is accomplished by a link 106 journaled at one end on a pin 107 mounted eccentrically upon the gear 84. A pin 105 is pivoted to the opposite end of link 106 and carries a pawl 108 engageable with a toothed wheel 109 journaled on shaft 111 carried by table 61. A radial arm 112 is journaled on shaft 111 and has its distal end pivoted on pin 105 so as to move the pawl 108 through an arc corresponding with the periphery of the wheel 109.

As here shown, wheel 109 is provided with four teeth 113 which are sequentially engageable by the pawl 108 as the arm 106 moves the arm 112 through slightly more than 90° of arc.

A second pawl 114 is mounted on table 61 and serves to prevent any backlash of wheel 109. Mounted on shaft 111 is a gear 116 which is engaged with a gear 117 carried by an upwardly extending shaft 118 upon which the split drive sprocket 77 is secured.

The geometry of gear 84, arm 106 and arm 112 is such that one complete revolution of gear 84 will advance shaft 111 through one-quarter turn. The gear ratios are chosen so that this will result in a 180° rotation of the shaft 118 and the sprocket 77 carried thereby.

As here shown, each of the spools 64 carry twelve sample tubes 23 in a concentric ring in which the thirteenth tube is missing. The sprockets 79 each have thirteen teeth, the chain has eleven links from one sprocket 79 to the next, and the drive sprocket 77 is formed with twenty-two teeth. When drive sprocket 77 rotates through 180°, this will naturally advance the chain eleven links. Due to the fact that the sprockets 79 each have thirteen teeth, this advance of the chain will rotate spools 64 two tubes less than one full revolution of 360°. This, of course, is dependent upon the latch 81 being engaged to halt rotation of turntable 65.

As may be seen from FIGURE 2, each of the tube carriers 24 is adapted to contain two tubes, and the transfer device 25 is formed to move two tubes from the spool 64 to the carrier 24 in each operation. It will thus be necessary for the spool 64 to be rotated to six different positions before the spool is moved away and the next spool brought to Station A by the turntable 65. In view of the foregoing, it should be clear that each half revolution of shaft 118 causes the spool 64 to rotate to the next one of the six desired positions and present fresh sample tubes to the transfer device 25.

The gear ratios of gears 83–84–87–88–91 and 92 are such that roller 96 will cause the latch mechanism to release every twelfth time the sprocket 77 makes a half revolution. This is done so that the tubes will be presented individually to a Station C for removing and further processing by other automtic analytical components, and to allow time for the centrifuging operation.

During the first six half revolutions of sprocket 77, the transfer mechanism is operative. The tubes will be presented in pairs at Station A for transfer to Station B and for return of tubes from Station B to Station A. At the same time six of the tubes in the next spool 64' will be presented to the Station C. These six tubes will consist of every second tube around the periphery of the spool.

During the next six half revolutions of sprocket 77, the transfer mechanism is inoperative and the centrifuge spins to accomplish its centrifuging function. The sprocket 77 continues to make its half revolutions during this period and the six tubes in spool 64' not previously presented to Station C are presented during this cycle.

It should be noted that the latch 81 is located at the position of spool 64'. This is to insure precise locating of the spool 64' and accordingly precise positioning of the tubes at Station C. The closeness of spool 64' to sprocket 77 reduces backlash in the chain, resulting in precise positioning of the spool.

In accordance with the present invention, the transfer means 25 speeds up its function by transporting the pairs of tubes 23 from Station A to Station B while at the same time returning a pair of centrifuged tubes from Station B to Station A.

The transfer means 25 includes a transfer head 121 mounted for rotation about a vertical axis positionable midway between Station A and Station B, and finger means 122 for releasably gripping the upper ends of tubes 23, the finger means being carried on the transfer head in spaced relation to the axis of rotation by a distance equal to the distance of Station A and Station B from such axis so as to alternately locate the finger means over the tube rack 64 and tube carrier 24 as the transfer head rotates.

Also included in the transfer means is an elevator means 123 for selectively imparting a vertically reciprocable component of movement to the transfer head 121 for raising tubes 23 gripped by the finger means 122 out of, and for lowering such tubes into, the tube rack and tube carrier.

Figure 8:
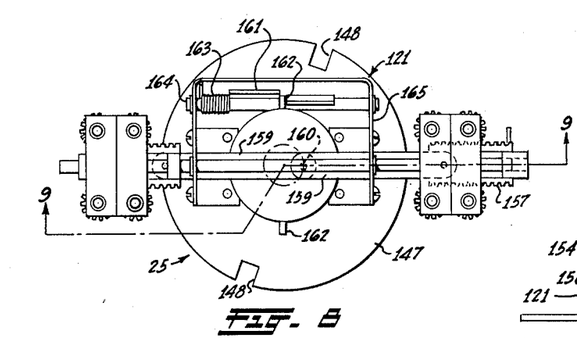
FIGURE 8, a plan view of a transfer device forming part of the present invention.
Figure 9:
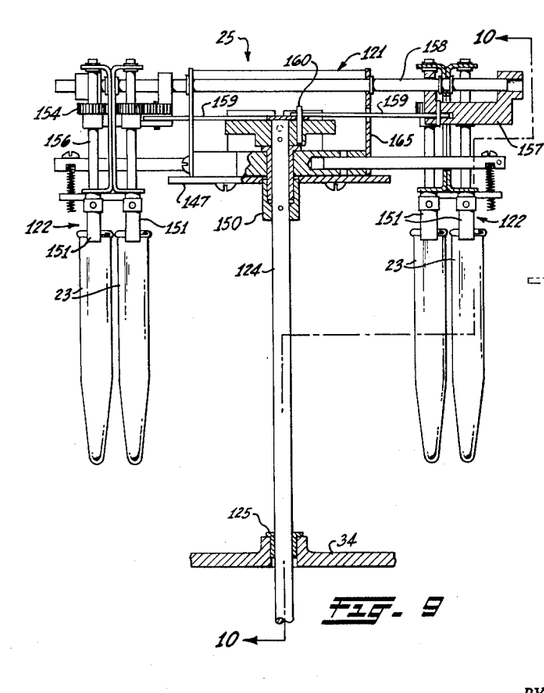
FIGURE 9, a cross-sectional view, taken substantially on the plane of line 9—9 of FIGURE 8.
Figure 10:
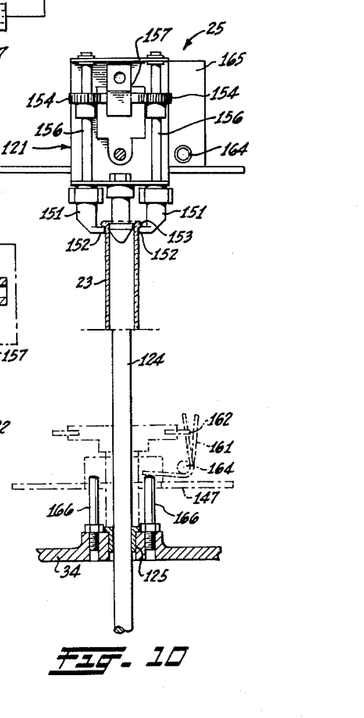
FIGURE 10, a cross-sectional view taken substantially on the plane of line 10—10 of FIGURE 9.

As may best be seen in FIGURES 8–10 of the drawings, the transfer head 121 is carried upon a vertical shaft 124 which is journaled for axial and rotational movement in a bearing 125 carried by table 61.

The elevator means 123 includes a chain 126 entrained over sprockets 127 and 128 mounted upon shafts 129 and 131, respectively, such shafts being journaled for rotation in a housing 132 depending from the table 61. The sprockets 127 and 128 are arranged to provide a vertically elongated chain loop parallel to shaft 124, see FIGURES 11 and 12.

Journaled to shaft 124 is a cage 133. Collar type bearings 134 permit relative rotational movement, but secure the cage to the shaft for joint vertical movement.

Figure 11:
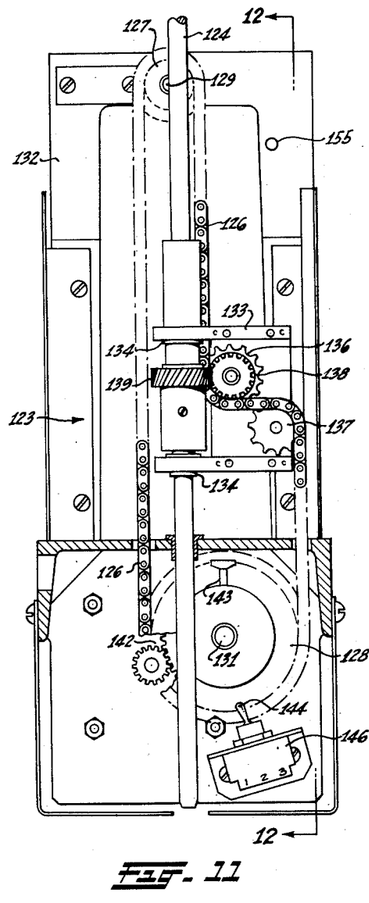
FIGURE 11, an enlarged detail view of a drive mechanism for the transfer device.
Figure 12:
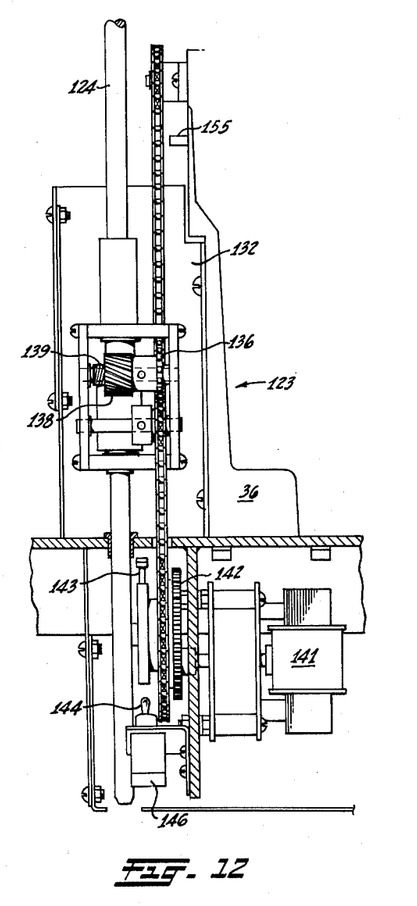
FIGURE 12, a cross-sectional view taken substantially on the plane of line 12—12 of FIGURE 11.

A pair of sprockets 136 and 137 are journaled in offset relation in the cage 133 and the chain 126 is entrained around the sprockets in the manner shown in FIGURE 11. Secured for joint rotation to sprocket 136 is a helical gear 138 which is enmeshed with a mating helical gear 139 fixed to the shaft 124. When the transfer head 121 is held against rotation, gear 139 prevents gear 138, and accordingly sprocket 136, from rotating. Under these conditions the movement of the chain 126 will cause the cage 133 to move up or down, depending upon the direction of movement of the chain, and this will cause the shaft 124 and transfer head 121 carried thereon to move upwardly and downwardly in the same manner.

When the transfer head 121 is not being held against rotation, movement of the chain will rotate sprocket 136, causing gear 138 to rotate gear 139 and the shaft 124 to which it is affixed. This rotation of shaft 124 is utilized in the down position of the shaft to operate the finger means 122, and in the upper position of the shaft, to rotate the transfer head 121 so as to swing the finger means between Station A and Station B.

The chain 126 is driven by a motor 141 acting through suitable gears 142 to drive shaft 131. A pin 143 secured to and extending radially from shaft 131 is formed to strike and flip over the operating handle 144 of a toggle switch unit 146. The switch 146 is electrically connected to the motor 141 and serves to reverse its direction of movement at the proper times.

Mounted on the under side of the transfer head 121 and secured thereto is a disk-shaped member 147 having opposing peripheral notches 148 adapted for sliding engagement with an upstanding guide rod 149 mounted upon the centrifuge housing 34.

Whenever the transfer head 121 is below its uppermost position, one of the notches 148 engages rod 149 and prevents rotation of the transfer head. This insures that the finger means 122 will descend in precise position with relation to the sample tubes 23 at Stations A and B, see FIGURE 2. To permit this action, the transfer head 121 is journaled on the shaft 124, but is held from axial movement relative thereto by a collar 150.

The guide rod 149 extends upwardly to a position slightly below the uppermost position of the disk 147 so that the disk will be free to rotate once the uppermost position is reached. The parts are proportioned so that the chain 126 will continue to move until the disk 147 and transfer head 121 have rotated through 180° of arc. The switch 146 will then cause the chain 126 to reverse its direction of travel, lowering the disk 147. As the lowering action proceeds, the opposite notch 148 will be aligned with and engage around the guide rod 149.

The transfer head 121 is held against rotation relative to the shaft 124 by a finger member 161 mounted on disk 147 and formed for engagement with lugs 162 projecting from opposite sides of the transfer head. The member 161 preferably constitutes the end of a split plate fastened to rod 164 and biased toward shaft 124 by a coil spring 163 also mounted upon the rod 164. Carried on disk 147 is a frame 165 in which rod 164 is journaled. When the member 161 is swung out of the path of lugs 162, the shaft 124 will be free to rotate relative to the disk 147. Upwardly projecting pins 166 are adjustably secured to upper section 34 of the housing in position to so engage and displace member 161 when disk 147 reaches its lowermost position. This permits the shaft 124 to be rotated by the gears 138 and 139 and operate the finger means 122.

As a feature of the present invention, two sets of finger means 122 are provided on the transfer head 121. These are located in equidistant spaced relation to the shaft 124 on opposite ends of the transfer head. The two sets of finger means operate simultaneously. This permits one set of finger means to pick up the fresh samples at Station A, at the same time the other finger means is picking up the centrifuged samples at Station B. Rotation of the transfer head 180° then causes the two finger means to swap positions. This greatly speeds up the operation of the entire device, since the picking up and setting down of the sample tubes takes place simultaneously at Stations A and B. Each set of finger means 122 includes two pairs of tube-engaging fingers 151 movable between a closed position in gripping engagement with the centrifuge tubes 23 and an open position releasing the sample tubes.

As may best be seen from FIGURE 10 of the drawings, each of the fingers 151 is formed with a horizontal flange 152 engageable under the out-turned rims 153 of the centrifuge tubes 23. The fingers 151 are journaled on the transfer head for movement about vertical axes for swinging the flanges 152 into and out of engagement with the tube 23. Actuation of the fingers 151 is accomplished by pinion gears 154 mounted on shafts 156 which are secured to the fingers 151. Engaged between the gears 154 is a double-sided rack gear 157 carried for endwise reciprocation on the transfer head 121.

Leftward movement of the rack gears 157 as viewed in FIGURE 9 serves to swing fingers 151 into the closed, or tube-engaging position illustrated, and movement to the right swings the finger members to their open or tube-releasing position. Thus as the rack gears 157 reciprocate back and forth, the finger means at opposite ends of the transfer head will be opened and closed simultaneously.

The endwise reciprocating movement of the rack gears 157 is accomplished by a pair of link members 159 which are pivoted at one end on a pin 160 projecting upwardly from shaft 124 in eccentric relation thereto, the links 159 being pivotally secured at their opposite ends to the rack members 157. Relative rotation between the transfer head 121 and shaft 124 causes the rack gears 157 to move inwardly and outwardly, the links 159 providing, in effect, a pair of pitman arms.

Assuming the shaft 124 and transfer head 121 are in their lowermost position, and the fingers 151 are gripping the tubes 23, upward movement of the chain 126 by motor 141 will cause the cage 133 and hence the shaft 124 to rise. This rising action will continue until guide slot 148 passes above the guide rod 149.

At such time, cage 133 will strike a stop member 155 halting its upward movement. The helical gears 138 and 139 will thereupon effect rotation of the shaft 124 through 180° of arc, causing the finger means 122 to swap positions. At this point the pin 143 will engage and click over the handle 144 of switch 146 causing the motor 141 to reverse directions. The cage 133 will then descend until pins 166 disengage member 161 from lug 162, halting downward movement and causing the gears 138 and 139 to rotate shaft 124.

Since the transfer head will be held against rotation in this lowermost position by engagement of guide rod 149 in guide slots 148, the shaft 124 will rotate relative to the transfer head 121. This will cause the fingers 151 to swing to their open position, releasing the tubes 23.

The switch 146 thereupon reverses the direction of the motor 141 again, and the cycle is repeated, this time causing fingers 151 to swing to closed position so as to grip the set of sample tubes newly moved into place at Stations A and B.

From the foregoing, it will be seen that I have provided a novel centrifuging apparatus which is fully automatic to continuously process a large number of samples without attention by an operator and in a rapid and efficient manner.

I claim:

1. An automatic analytical centrifuge suitable for centrifuging sample tubes carrying liquid slurry to effect a separation of a precipitate and a filtrate in said tubes, comprising a spinnable centrifuging rotor journaled for high speed rotation around a central axis, said rotor being formed with a plurality of circumferentially spaced tube supporting elements evenly spaced on the circumference of a circle at the periphery of the rotor, said tube supporting elements including means on the rotor for pivotally supporting sample tubes with respect to the central axis of the rotor so that the bottoms of the tubes will be farther from the central axis than the tops of the tubes during the centrifuging operation, conveyor means formed for supporting a plurality of tubes and for presenting said tubes to a first station adjacent to said rotor in sequential order, said conveyor surrounding the centrifuging rotor, rotor indexing means formed for selectively positioning said tube supporting elements at a predetermined second station in sequential order, and transfer means operative in response to the positioning of said tubes and tube supporting elements at their respective stations for transporting tubes to be centrifuged from said conveyor to said tube supporting elements and centrifuged tubes from said tube supporting elements to said conveyor.

2. An automatic analytical centrifuging apparatus suitable for centrifuging sample tubes carrying liquid slurry to effect a separation of a precipitate and a filtrate in the tubes, comprising a rotor mounted to spin about a vertical axis and having a plurality of tube supporting elements, said tube supporting elements being evenly spaced on the circumference of a circle at the periphery of the rotor and having means for pivotally supporting sample tubes with respect to the central axis of the rotor so that the bottoms of the tubes will be farther from the central axis than the tops of the tubes during the centrifuging operation, drive means for spinning said rotor, conveyor means formed for supporting a plurality of tubes and for presenting said tubes to a first station adjacent to said rotor in sequential order, said conveyor surrounding the centrifuging rotor, rotor indexing means formed for selectively positioning said tube supporting elements at a predetermined second station in sequential order, transfer means operative in response to the positioning of said tubes and tube supporting elements at their respective stations for transporting tubes to be centrifuged from said conveyor to said tube supporting elements and centrifuged tubes from said tube supporting elements to said conveyor, and automatic control means connected to said rotor drive means and indexing means and to said transfer means, said control means being responsive to movement of said conveyor means for operating said transfer means to load said rotor with tubes to be centrifuged, then operating said drive means to spin the rotor for a predetermined period of time, and thereafter operating said conveyor and transfer means and said rotor indexing means so as to transport the centrifuged tubes from the rotor to the conveyor while simultaneously reloading the rotor with a new batch of tubes to be centrifuged.

3. An automatic analytical centrifuging apparatus suitable for centrifuging sample tubes carrying liquid slurry to effect a separation of a precipitate and a filtrate in the tubes, comprising a rotor mounted to spin about a vertical axis and having a plurality of tube supporting elements, said tube supporting elements being evenly spaced on the circumference of a circle at the periphery of the rotor and having means for pivotally supporting sample tubes with respect to the central axis of the rotor so that the bottoms of the tubes will be farther from the central axis than the tops of the tubes during the centrifuging operation, drive means for spinning said rotor, conveyor means formed for supporting a plurality of tubes and for presenting said tubes to a first station adjacent to said rotor in sequential order, said conveyor surrounding the centrifuging rotor, rotor indexing means formed for selectively positioning said tube supporting elements at a predetermined second station in sequential order, said rotor indexing means including a circuit having a plurality of photoelectric cells mounted in spaced positions corresponding to the spacing of said tube supporting elements and light sources for said cells operative in response to movement of said rotor for actuating an indexing drive, a transfer device formed for transporting tubes to be centrifuged from said first station to said second station and for transporting centrifuged tubes from said second station to said first station, and automatic control means connected to said rotor drive means and indexing means and to said transfer device, said control means being responsive to movement of said conveyor means for operating said transfer means to load said rotor with tubes to be centrifuged, then operating said drive means to spin the rotor for a predetermined period of time, and thereafter operating said conveyor and transfer device and said rotor indexing means so as to transport the centrifuged tubes from the rotor to the conveyor while simultaneously reloading the rotor with a new batch of tubes to be centrifuged.

4. The automatic centrifuge as defined in claim 1 in which said conveyor means includes a chain-driven turntable having a plurality of tube supporting spools rotatably mounted thereon and movable successively into position for placing the tubes in the spools at said first station in accordance with movement of said chain.

5. The automatic centrifuge as defined in claim 1 in which said rotor indexing means includes a reversible indexing drive motor, a selectively releasable clutch for operatively connecting said motor to said rotor, and photoelectric control means responsive to movements of said rotor and connected to said motor and said clutch for rotating said rotor so as to position said tube supporting elements at said station and in said sequential order.

6. The automatic centrifuge as defined in claim 1 in which said rotor indexing means comprises a reversible motor, an output shaft driven by said reversible motor, a clutch for operatively connecting said shaft to the centrifuge rotor so as to rotate the latter in accordance with rotation of said shaft, and photoelectric control means responsive to the position of said rotor for operating said motor so as to position the tube supporting element at the desired station, said control means including a pair of photoelectric cells having a spaced light source and a plate mounted for rotation with said rotor and intercepting light directed from said source at said cells, said plate having slots formed therein whereby light will impinge on said cells at a predetermined position of the rotor.

7. The automatic centrifuge as defined in claim 1 in which said rotor indexing means comprises a reversible motor, an output shaft driven by said reversible motor, a clutch for operatively connecting said shaft to the centrifuge rotor so as to rotate the latter in accordance with rotation of said shaft, photoelectric control means responsive to the position of said rotor so as to position the tube supporting elements at the desired station, said control means including a pair of photoelectric cells having a spaced light source and a plate mounted for rotation with said rotor and intercepting light directed from said source at said cells, said plate having slots formed therein whereby light will impinge on said cells at a predetermined position of the rotor, said motor having a moderate speed in one direction and a slow speed in the opposite direction, and a circuit connecting said motor and cells and formed to operate the motor in the first-named direction and to reverse the motor when said slots allow the light to impinge on one of the cells and to stop the motor when said slots allow the light to impinge on both of said cells.

8. The automatic centrifuge as defined in claim 1 in which said conveyor means comprises a ring shaped turntable mounted for coaxial rotation around the centrifuge rotor, a plurality of tube supporting spools rotatable on said turntable and movable therewith around the rotor, a latch selectively engageable with said turntable for holding the latter against rotation, drive means including a motor-driven chain engaged with sprockets connected to said spools, said drive means being formed to rotate said spools when said turntable is held against rotation by said latch and to rotate said turntable when said latch is released, and control means for operating said drive means and latch so as to present the tubes in each of said spools to said station in sequential order.

9. In an automatic analytical centrifuge suitable for centrifuging sample tubes carrying liquid slurry to effect a separation of a precipitate and a filtrate in said tubes having a spinnable rotor and a transfer device for transferring tubes between the rotor and a predetermined station, a conveyor for presenting tubes in sequential order at such stations, comprising a ring-shaped turntable mountable for coaxial rotation around the centrifuge rotor, a plurality of tube supporting spools rotatable on said turntable and movable therewith around the rotor, a latch selectively engageable with said turntable for holding the latter against rotation, drive means including a motor-driven chain engaged with sprockets connected to said spools when said turntable is held against rotation by said latch and to rotate said turntable when said latch is released, and control means for operating said drive means and latch so as to present the tubes in each of said spools to said station in sequential order, each of said spools being formed to support a plurality of tubes in circumferentially spaced locations, and said sprockets having a number of teeth equal to twice the number of tube locations on said spools minus two and the spacing between said sprockets equalling one-half the said number of teeth whereby equal increments of movement of said chain will advance the tube locations sequentially into position at said station when said latch is engaged and will advance the spools sequentially when the latch is disengaged.

10. The automatic centrifuge as defined in claim 1 wherein the transfer means comprises a transfer head mounted for rotation about a vertical axis and positioned between the two stations, finger means carried by said transfer head in spaced relation to said axis by a distance equal to the distance between said axis and each of said stations so as to alternately position said finger means over said tubes in each station as said transfer head rotates, elevator means for selectively imparting a vertically reciprocable component of movement of said transfer head for raising the tubes when gripped by said finger means, and means for selectively rotating said transfer head between positions overlying said stations.

11. The automatic centrifuge as defined in claim 1 wherein the transfer means comprises a transfer head, a vertical shaft journaled for axial and rotational movement and positioned between the two stations, the transfer head being mounted on said shaft for vertical movement therewith and journaled for rotation on the shaft, finger means carried by said transfer head in spaced relation to the axis of said shaft by distance equal to the distance of each station from said axis so as to alternately position said finger means over each station as said transfer head rotates, elevator means for selectively imparting a vertically reciprocable component of movement to said transfer head and said shaft for raising the tubes when gripped by said finger means, and control means for selectively connecting said shaft and said transfer head for joint movement so as to effect rotation of the transfer head with said shaft between positions overlying said stations when said transfer head is in its uppermost position.

12. The automatic centrifuge as defined in claim 10 wherein said elevator means includes a chain disposed in a vertically elongated loop parallel to said shaft, a motor for driving said chain, a cage journaled on said shaft and secured for joint axial movement therewith, a pair of sprockets on said cage entrained with said chain, intermeshed helical gears on said shaft and one one of said sprockets, said gears having a frictional resistance to relative movement sufficient to cause said cage to move with said chain between an up position and a down position.

13. The automatic centrifuge as defined in claim 11 wherein an actuating means is carried on said transfer head and effects movement of said fingers between open and closed positions upon relative rotation between said shaft and said transfer head, and latch means for releasably holding said transfer head against rotation on said shaft and a fixed member formed to intercept and release said latch means as said transfer head approaches its lowermost position.

14. The automatic centrifuge as defined in claim 1 wherein there is a power means for effecting rotation of said transfer head between positions overlying the two stations and a control means connected to each of the aforesaid means and formed for operating the same sequentially whereby said finger means will be positioned over the first station then lowered into position for engagement with said tubes at said first station then actuated to grip said tubes, then raised to clear the tubes from said first station, then rotated to a position over the second station, then lowering the tubes into the said second station and actuated to release the said tubes.

15. The automatic centrifuge as defined in claim 1 wherein said transfer head comprises spaced finger means having tube engaging fingers movable between an open position and a closed position in gripping engagement with said tube, said fingers being journaled on said transfer head for movement about vertical axes and having horizontal flanges engageable with the outturned rims of said tubes when rotated into confronting relation, pinion gears on said fingers, a rack gear on said transfer head engaging said pinion gears for rotating said fingers upon endwise movement of the rack gear and means carried by said transfer head for operating said rack to effect said endwise movement relative to said transfer head.

References Cited in the file of this patent
UNITED STATES PATENTS

| | | |
|---|---|---|
| 1,556,078 | Clymer | Oct. 6, 1925 |
| 1,769,889 | McClaran et al. | July 1, 1930 |
| 2,567,033 | Schutz | Sept. 4, 1951 |
| 2,773,582 | Denyssen et al. | Dec. 11, 1956 |
| 2,888,131 | Allen | May 26, 1959 |
| 2,904,161 | Schreiber | Sept. 15, 1959 |
| 2,984,337 | Couch et al. | May 16, 1961 |